(12) United States Patent
Goetz et al.

(10) Patent No.: US 7,635,523 B2
(45) Date of Patent: Dec. 22, 2009

(54) GRINDING AND STAMPING BEHAVIOR OF OPHTHALMIC GLASSES WITH HYDROPHOBIC COATING

(75) Inventors: Baerbel Goetz, Augsburg (DE); Cecile Stolz, Munich (DE); Gerd-Peter Scherg, Munich (DE)

(73) Assignee: Rodenstock GmbH, Munich (DE)

( * ) Notice: Subject to any disclaimer, the term of this patent is extended or adjusted under 35 U.S.C. 154(b) by 398 days.

(21) Appl. No.: 11/717,211

(22) Filed: Mar. 13, 2007

(65) Prior Publication Data

US 2007/0172622 A1  Jul. 26, 2007

Related U.S. Application Data

(63) Continuation of application No. PCT/EP2005/006373, filed on Jun. 14, 2005.

(30) Foreign Application Priority Data

Sep. 14, 2004  (DE) .................... 10 2004 044 441

(51) Int. Cl.
*B32B 25/20* (2006.01)
(52) U.S. Cl. ......................... 428/447; 528/42
(58) Field of Classification Search .............. 428/447; 528/42
See application file for complete search history.

(56) References Cited

U.S. PATENT DOCUMENTS

| 5,972,517 A | 10/1999 | Kondo et al. |
| 2004/0142185 A1 | 7/2004 | Takushima |
| 2005/0098098 A1 | 5/2005 | Biver et al. |

FOREIGN PATENT DOCUMENTS

| EP | 0 841 581 A1 | | 5/1998 |
| EP | 0 933 377 A2 | | 8/1999 |
| WO | 03 057641 | * | 7/2003 |
| WO | WO 2004/046791 A1 | | 6/2004 |

OTHER PUBLICATIONS

International Search Report dated Sep. 29, 2005 including English translation of pertinent portion (Twelve (12) pages).
International Preliminary Examination Report dated Mar. 29, 2007 (Forms PCT/IB/338, PCT/IB/373, and PCT/ISA/237) (Eight (8) pages).

* cited by examiner

*Primary Examiner*—Kuo-Liang Peng
(74) *Attorney, Agent, or Firm*—Crowell & Moring LLP

(57) ABSTRACT

An ophthalmic glass that has a special layer structure and a surface energy of less than 15 mJ/m$^2$, as well as a method of making a spectacle lens by grinding and/or stamping such an ophthalmic glass.

9 Claims, No Drawings

GRINDING AND STAMPING BEHAVIOR OF OPHTHALMIC GLASSES WITH HYDROPHOBIC COATING

CROSS REFERENCE TO RELATED APPLICATIONS

This application is a continuation of international application no. PCT/EP2005/006373, filed Jun. 14, 2005 designating the United States of America and published in German on Mar. 23, 2006 as WO 2006/029661, the entire disclosure of which is incorporated herein by reference. Priority is claimed based on Federal Republic of Germany patent application no. DE 10 2004 044 441.2, filed Sep. 14, 2004.

BACKGROUND OF THE INVENTION

The present invention relates to an ophthalmic glass with a special layer structure and a surface energy of less than 15 mJ/m$^2$ and to the use thereof to grind and/or stamp ophthalmic lenses.

Various coated ophthalmic glasses are known in the art. They usually have a very smooth surface however, and thus cause problems, such as undesired axial rotation in grinding and/or stamping ophthalmic lenses. Also known in the art are ophthalmic glasses provided with a permanent hydrophobic and oleophobic coating, whose surface energy is adjusted to $\geq 15$ mJ/m$^2$ by applying a temporary protective layer, which results in better grinding behavior.

SUMMARY OF THE INVENTION

An object of the present invention is to provide an improved ophthalmic glass, which has a hydrophobic and oleophobic coating.

Another object of the invention is to provide a coated ophthalmic glass which has improved grinding and stamping behavior or stamping capacity.

A further object of the invention is to provide a method of producing spectacle lenses using an ophthalmic glass provided with a hydrophobic and oleophobic coating.

These and other objects are achieved by the invention as described and claimed hereinafter.

Specifically, the present invention provides an ophthalmic glass, which comprises, in the following sequence (starting from the ophthalmic glass): (a) a coating with hydrophobic and oleophobic properties, which (a1) comprises a silane with at least one fluorine containing group with more than 20 carbon atoms or (a2) a perfluorinated hydrocarbon compound, optionally (b) a removable layer of an inorganic material, and (c) a transparent, removable protective layer applied thereto, which comprises a silane with at least one fluorine containing group with 20 or fewer carbon atoms ($\leq 20$ carbon atoms), such that the ophthalmic glass with the above-described layer structure has a surface energy of less than 15 mJ/m$^2$.

DESCRIPTION OF PREFERRED EMBODIMENTS

According to a preferred embodiment of the present invention, an ophthalmic glass is provided, which comprises (a) a coating with hydrophobic and oleophobic properties, which comprises (a1) a silane with at least one fluorine containing group with more than 20 carbon atoms or (a2) a perfluorinated hydrocarbon compound, and (c) a transparent removable protective layer applied thereto, which comprises a silane with at least one fluorine containing group with 20 or fewer ($\leq 20$) carbon atoms, such that the ophthalmic glass with the above-described layer structure has a surface energy of less than 15 mJ/m$^2$.

Preferably, the ophthalmic glass according to the invention with the above-described layer structure has a surface energy of less than 14 mJ/lm$^2$, particularly preferably less than 13 mJ/m$^2$ and most preferably less than 12 mJ/m$^2$.

The surface energy is determined using the Owens-Wendt method, which is described in the following publication: "Estimation of the surface force energy of polymers," Owens D. K., Wendt R. G. (1969), J. APPL. POLYM. SCI., 13, 1741-1747. The liquids used in the Owens-Wendt method are water, diiodomethane and hexadecane.

The ophthalmic glass used may be a treated or untreated synthetic glass formed of, for example, polythiourethane, polymethylmethacrylate (PMMA), polycarbonate, polyacrylate or polydiethylene glycol bisallyl carbonate (CR 39®), or a treated or untreated mineral glass. A conventionally used hard layer and/or a conventional antireflection layer having, for example, a one- to six-layer structure may be applied directly to the surface of an untreated ophthalmic glass. In this case, the coating (a) with hydrophobic and oleophobic properties is not applied directly to the surface of the ophthalmic glass but to the hard layer or the antireflection layer applied to the ophthalmic glass. Persons skilled in the art are familiar with such single or multilayer antireflection coatings and will be in a position to suitably select appropriate materials and layer thicknesses of an antireflection layer.

The coating (a) with hydrophobic and oleophobic properties preferably comprises (a1) a silane with at least one fluorine containing group with more than 20 carbon atoms, preferably more than 30 carbon atoms, particularly preferably more than 40 carbon atoms and most preferably more than 50 carbon atoms. The coating (a) with hydrophobic and oleophobic properties can, however, also be formed of a corresponding siloxane or silazane with at least one fluorine containing group with more than 20 carbon atoms.

The silane (a1) with at least one fluorine containing group with more than 20 carbon atoms is preferably based on a silane with at least one hydrolizable group. Suitable hydrolizable groups are not subject to any special limitation and persons skilled in the art will be familiar with them. Examples of hydrolyzable groups bonded to a silicon atom are halogen atoms, such as chlorine, —N-alkyl groups such as —N(CH$_3$)$_2$ or —N(C$_2$H$_5$)$_2$, alkoxy groups or isocyanate groups. An alkoxy group, particularly a methoxy or ethoxy group, is preferred as the hydrolizable group. It is also possible, however, to use a silane (a1) with at least one fluorine containing group with more than 20 carbon atoms, which carries at least one hydroxyl group. If a silane (a1) with at least one fluorine containing group with more than 20 carbon atoms is used, which is based on a silane with at least one hydrolyzable group or hydroxyl group, a durable chemical bond can be formed between the surface of the treated or untreated ophthalmic glass or the surface of the hard or the antireflection layer of an ophthalmic glass and the silane (a1), e.g., through hydroxyl groups on the surface. This is preferred according to the present invention.

The silane (a1) with at least one fluorine containing group with more than 20 carbon atoms preferably comprises one or more polyfluorinated group(s) or one or more perfluorinated group(s). One or more polyfluorinated or perfluorinated alkyl group(s), one or more polyfluorinated or perfluorinated alkenyl group(s) and/or one or more polyfluorinated or perfluorinated polyether unit containing group(s) are particularly preferred. Preferred polyether units containing groups comprise one or more —$(CF_2)_xO$ unit(s) where x=1 to 10, with x=2 to 3 being particularly preferred.

According to a preferred embodiment of the present invention, the silane (a1) has a fluorine containing group with more than 20 carbon atoms and three hydrolyzable groups or hydroxyl groups.

It may also be preferable if the coating (a) with hydrophobic and oleophobic properties is formed of a perfluorinated hydrocarbon compound. The perfluorinated hydrocarbon compound is not subject to any substantial limitation. The use of polytetrafluoroethylene as the perfluorinated hydrocarbon coating is preferred, however.

The coating (a) with hydrophobic and oleophobic properties is preferably formed exclusively of (a1) a silane with at least one fluorine containing group with more than 20 carbon atoms or (a2) a perfluorinated hydrocarbon compound. It is also possible, however, to use a mixture of one or more silane(s) (a1) and/or one or more perfluorinated hydrocarbon compound(s) for the coating (a), optionally with additional inorganic, organometallic or organic additives.

The removable layer (b) formed of an inorganic material, which is optionally provided between the coating (a) and the protective layer (c), can be formed of a material conventionally used for optical coatings and is not subject to any special limitations. Suitable materials for the removable layer (b) of an inorganic material include, in particular, $SiO_2$, $Al_2O_3$, $Ta_2O_5$, $TiO_2$, $ZrO_2$, Ag, Cu, Au or Cr, or mixtures thereof. The layer (b) can be formed of one or more layer(s) of the above-described materials; with a one-layer or two-layer structure being preferred.

The transparent removable protective layer (c) comprises a silane with at least one fluorine containing group with 20 or fewer ($\leqq 20$) carbon atoms, preferably 18 or fewer ($\leqq 18$) carbon atoms, particularly preferably 15 or fewer ($\leqq 15$) carbon atoms and most preferably 12 or fewer ($\leqq 12$) carbon atoms. However, the transparent removable protective layer (c) can also comprise a corresponding siloxane or silazane with at least one fluorine containing group with 20 or fewer ($\leqq 20$) carbon atoms.

The silane with at least one fluorine-containing group with 20 or fewer ($\leqq 20$) carbon atoms in the protective layer (c) preferably comprises one or more partially fluorinated fluoroalkyl group(s) or fluoroalkenyl group(s). A silane with a partially or incompletely fluorinated fluoroalkyl group or fluoroalkenyl group according to the present invention should be understood to mean a silane that has no perfluorinated fluoroalkyl group or no perfluorinated fluoroalkenyl group. The partially fluorinated fluoroalkyl or fluoroalkenyl group carries hydrogen atoms in addition to fluorine atoms, such that the partially fluorinated fluoroalkyl or fluoroalkenyl group contains preferably no more than 90% fluorine atoms, particularly preferably no more than 80% fluorine atoms. The silane with at least one fluorine containing group with $\leqq 20$ carbon atoms in the protective layer (c) can also have one or more hydrolyzable group(s) or hydroxyl group(s), as described above.

The transparent removable protective layer (c) is preferably formed exclusively of a silane with at least one fluorine containing group with 20 or fewer ($\leqq 20$) carbon atoms. It is also possible, however, to use a mixture of one or more silane(s) with at least one fluorine containing group with 20 or fewer ($\leqq 20$) carbon atoms for the protective layer (c), optionally with additional inorganic, organometallic or organic additives.

The coating (a) with hydrophobic and oleophobic properties and the transparent removable protective layer (c) can be applied to the ophthalmic glass by conventional processes. It is preferred to apply these coatings by vapor deposition, chemical vapor deposition or dipping. The optionally provided removable layer (b) formed of an inorganic material is preferably applied by vapor deposition, sputtering or plasma-assisted chemical vapor deposition.

The layer thickness of the coating (a) with hydrophobic and oleophobic properties, which is applied to the surface of the ophthalmic glass, is in principle not subject to any special limitation. Preferably, however, it is adjusted to a thickness of less than or equal to 50 nm ($\leqq 50$ nm), preferably less than or equal to 20 nm ($\leqq 20$ nm).

The layer thickness of the removable layer (b) formed of an inorganic material is not subject to any substantial limitation, but normally ranges from approximately 1 nm to approximately 200 nm; with a layer thickness ranging from 10 nm to 100 nm being preferred.

The layer thickness of the transparent removable protective layer (c) is not subject to any special limitation, but is preferably less than 50 nm (<50 nm), particularly preferably less than 20 nm (<20 nm) and most preferably ranges between approximately 3 nm and approximately 10 nm.

It is moreover preferred if the roll-off angle or falling angle of a reference glass substrate provided with coating (a) is smaller than the roll-off angle of a reference glass substrate provided with protective coating (c). The reference glass substrate used, which is coated with either coating (a) or protective coating (c), is one of the above-described glass substrates (particularly an uncoated ophthalmic glass, an ophthalmic glass coated with a hard layer and/or a conventional antireflection coating) formed of the above-described materials suitable for the ophthalmic glass according to the invention. According to the invention, the rolling angle is determined by a measuring method in which a coated reference glass substrate is gradually tilted starting from an angle of 0° (i.e., a horizontal orientation of the reference glass substrate) until a drop of liquid applied to the coated reference glass substrate, e.g., water or hexadecane, starts to roll. This measuring method for determining the rolling angle substantially corresponds to the method described in published European patent application no. EP 933 377 A2 on page 13, under paragraph [0123].

The present invention furthermore provides for the use of the above-defined ophthalmic glass in grinding and/or stamping ophthalmic lenses. It has been found that when the ophthalmic glass coated according to the invention is used for grinding ophthalmic lenses, undesired axial rotation can be very effectively prevented. In this connection it was particularly surprising that the ophthalmic glass coated according to the invention makes it possible to achieve an excellent grinding and stamping behavior despite a surface energy of less than 15 $mJ/m^2$. After grinding the coated ophthalmic glass, the transparent removable protective coating (c) together with the optionally provided removable layer (b) formed of an inorganic material can be simply removed again, e.g., by wiping it off by hand with a cloth. The excellent ophthalmic glass properties, such as layer adhesion, scratch resistance and climatic resistance as well as the excellent properties of the ophthalmic glass coated with the permanent coating (a), such as hydrophobicity, oleophobicity, cleanability and smoothness are retained.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An ophthalmic glass, comprising, in the following sequence:
   (a) a coating with hydrophobic and oleophobic properties, which comprises:
      (a1) a silane with at least one fluorine containing group with more than 20 carbon atoms, or
      (a2) a perfluorinated hydrocarbon compound;
   (b) optionally a removable layer of an inorganic material, and
   (c) a transparent removable protective layer applied thereto, which comprises a silane with at least one fluorine containing group with $\leq 20$ carbon atoms;
   wherein the ophthalmic glass with the above-described layer structure has a surface energy of less than 15 mJ/m$^2$.

2. An ophthalmic glass according to claim 1, wherein the coating with hydrophobic and oleophobic properties is formed of a silane with at least one fluorine containing group with more than 20 carbon atoms.

3. An ophthalmic glass according to claim 2, wherein the silane is based on a silane with at least one hydrolyzable group or hydroxyl group.

4. An ophthalmic glass according to claim 2, wherein the silane comprises at least one polyfluorinated group or at least one perfluorinated group.

5. An ophthalmic glass according to claim 2, wherein the silane comprises at least one polyfluorinated or perfluorinated alkyl group, at least one polyfluorinated or perfluorinated alkenyl group, and/or at least one polyfluorinated or perfluorinated polyether unit containing group.

6. An ophthalmic glass according to claim 1, wherein the coating with hydrophobic and oleophobic properties comprises a perfluorinated hydrocarbon compound.

7. An ophthalmic glass according to claim 6, wherein the perfluorinated hydrocarbon compound is polytetrafluoroethylene.

8. An ophthalmic glass according to claim 1, wherein the silane in the protective layer (c) comprises at least one partially fluorinated fluoroalkyl group or fluoroalkenyl group.

9. A method of making a spectacle lens comprising grinding or stamping an ophthalmic glass according to claim 1.

* * * * *